March 23, 1965  H. M. BAUER  3,174,505
PRESSURE REGULATOR VALVE HAVING DAMPING MEANS
Filed May 12, 1960  3 Sheets-Sheet 1
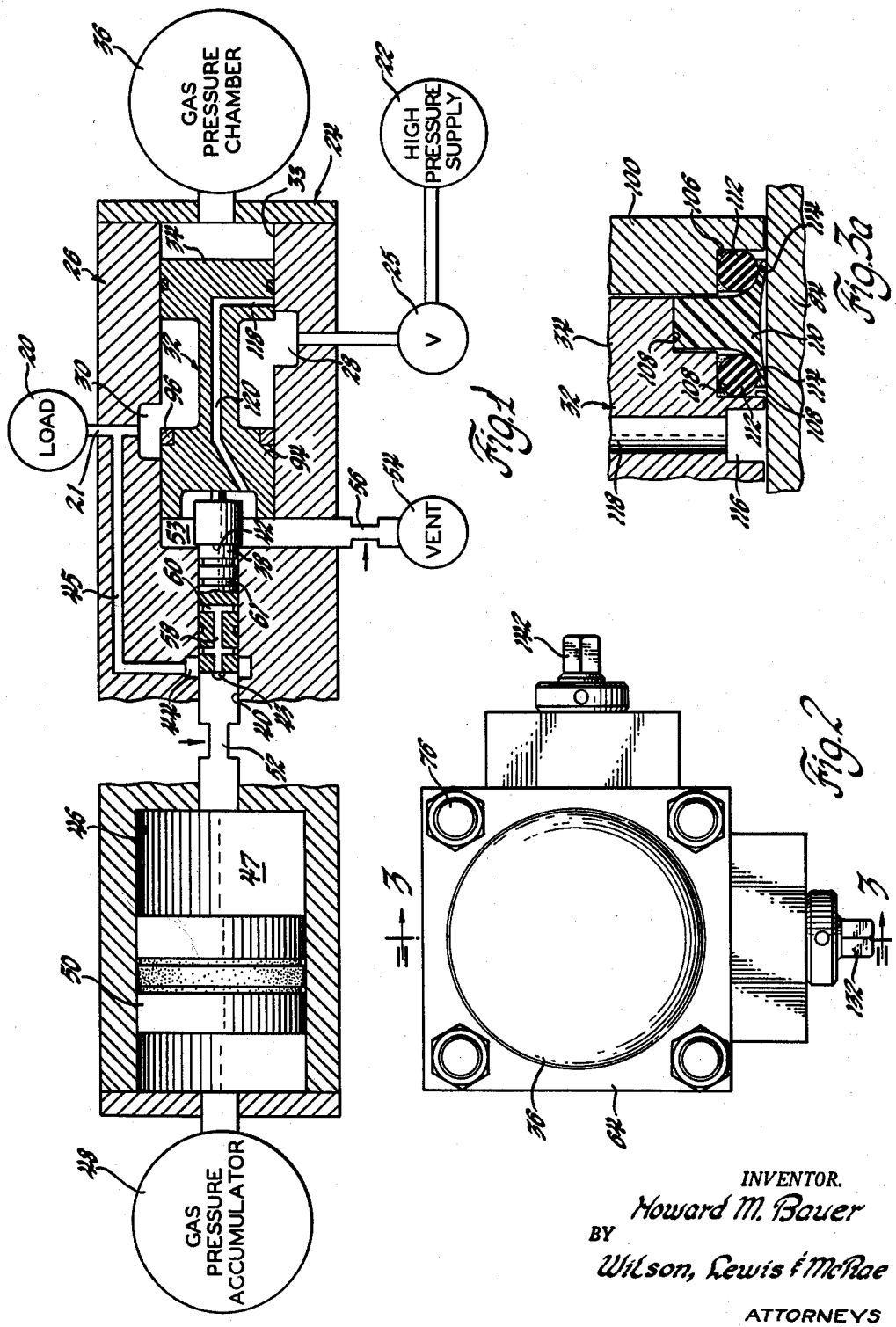
INVENTOR.
Howard M. Bauer
BY
Wilson, Lewis & McRae
ATTORNEYS March 23, 1965   H. M. BAUER   3,174,505
PRESSURE REGULATOR VALVE HAVING DAMPING MEANS
Filed May 12, 1960   3 Sheets-Sheet 2
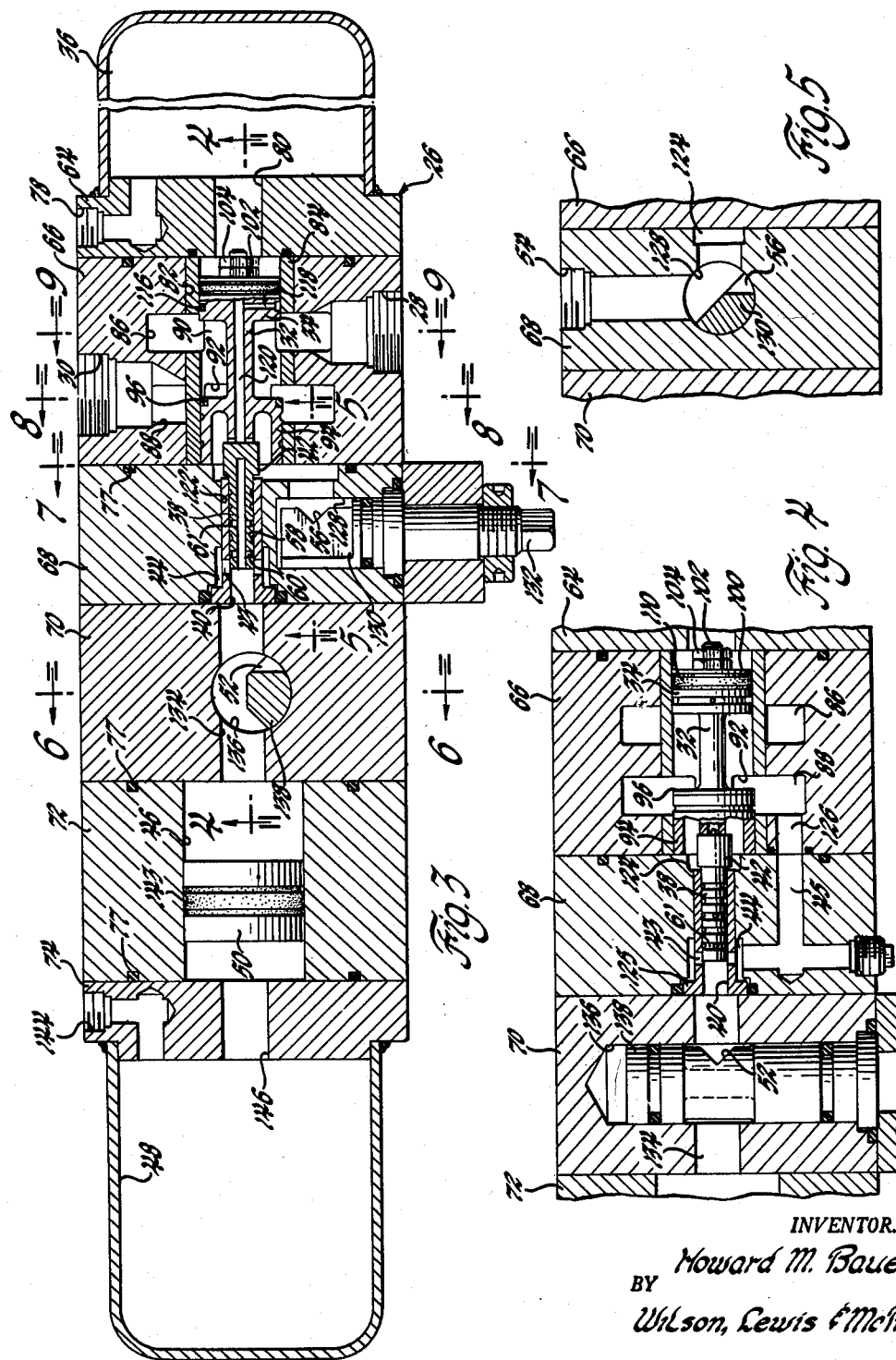
INVENTOR.
Howard M. Bauer
BY
Wilson, Lewis & McRae
ATTORNEYS March 23, 1965 H. M. BAUER 3,174,505
PRESSURE REGULATOR VALVE HAVING DAMPING MEANS
Filed May 12, 1960 3 Sheets-Sheet 3

INVENTOR.
Howard M. Bauer
BY
Wilson, Lewis & McRae
ATTORNEYS

United States Patent Office 3,174,505
Patented Mar. 23, 1965

3,174,505
PRESSURE REGULATOR VALVE HAVING
DAMPING MEANS
Howard M. Bauer, 26656 Rouge River Drive,
Dearborn, Mich.
Filed May 12, 1960, Ser. No. 28,581
9 Claims. (Cl. 137—505.18)

This invention relates to fluid supply and pressure regulating systems and to pressure regulating valves used in such systems. It is particularly adapted to hydraulic systems requiring high pressure, such as several thousand pounds per square inch, requiring the maintenance of pressures which are extremely close to constant, and demanding oil at widely varying rates of flow. Such rates of flow may be required to vary from zero to the maximum capacity of the system (such as hundreds of gallons per minute) in a very short space of time such as $\frac{1}{50}$ to $\frac{1}{200}$ of a second. Heavy machine tool drives are examples of devices in which my invention may be used to advantage.

One of the objects of this invention is to provide an improved and highly accurate pressure regulating system and apparatus therefor which regulate the pressure supplied to a load with extreme nicety maintaining a constant average pressure from which the unavoidable variations, which are inherently necessary for control, are minute in value and of extremely short duration.

Another object of the invention is to provide an improved regulating valve in which excessive movement or over-correction in the course of regulating the pressure is reduced to a very small minimum or entirely eliminated.

Another object is to provide an improved pressure regulating valve which has a very rapid response to slight changes in pressure and one in which the rate of response and frequency of cycling can be adjusted and controlled very simply. This permits very rapid changes in rates of flow without significant changes in pressure.

More specifically the objects include the provision of a pressure regulating valve of low inertia but which is rugged enough to regulate accurately pressures of several thousand pounds per square inch, an improved means for reducing the friction between the moving parts of such valves, and improved sealing against such high pressures.

Other objects of my invention will be evident from the following description and appended claims, reference being had to the accompanying drawings forming a part of this specification, in the various views of which the same reference character always designates the same part.

In the drawings:

FIG. 1 is a schematic illustration of a hydraulic system embodying one form of the invention.

FIG. 2 is a structural end elevation of a pressure regulating valve forming part of the control system shown in FIG. 1.

FIG. 3 is a section on the line 3—3 of FIG. 2.

FIG. 3a is an enlarged fragment of FIG. 2.

FIG. 4 is a section on the line 4—4 of FIG. 3.

FIG. 5 is a section on the line 5—5 of FIG. 3.

Figure 6:
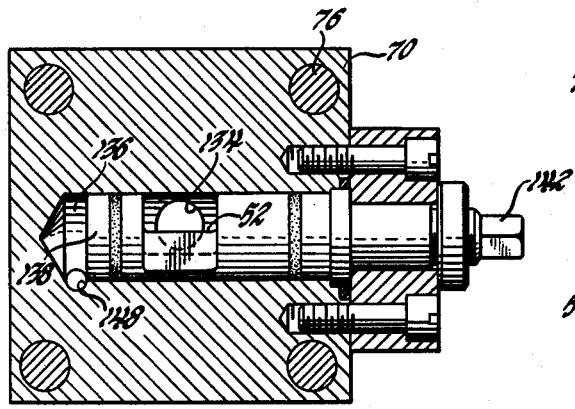
FIG. 6 is a section on the line 6—6 of FIG. 3.

Before explaining the invention in detail, it is to be understood that the invention is not limited to the details of construction nor arrangement of parts illustrated in the accompanying drawings since the invention may be embodied in other forms and may be practiced in various ways. Also it is to be understood that the phraseology or terminology employed in this explanation does not limit the invention, but is solely for the purpose of description and illustration.

Referring to FIG. 1, 20 represents a work load requiring a supply of oil through passage 21 at closely regulated constant pressure and widely varying volume, such as a drive for a machine tool. The load is supplied from a high pressure source 22 through a regulating valve generally designated 24 and a shut-off valve 25. The regulating valve includes a valve body 26 having a constantly open inlet port 28 connected to the source 22 and an outlet port 30 constantly connected to the delivery passage. The port 30 can be completely closed and can be opened to a varying extent by a valve spool or member 32 slidable in a bore 33. The right end of the valve 32 constitutes a piston 34 constantly urged to the left as FIG. 1 is seen, and tending to open the outlet port 30, by the pressure of gas confined in a pressure chamber 36 at a constant pressure which may be for example two hundred pounds per square inch. Nitrogen is an example of a gas suitable for this purpose. The valve is urged to the right, tending to close the outlet port, by the regulated pressure of oil at the load, acting on a small piston 38 slidable in a fluid pressure closing chamber formed by bore 40. The piston is limited in its movement toward the left by a stop 42. The pressure of the load is communicated to the bore 40 at the left end of the small piston by a port 43 from a load-pressure-indicating chamber 44, connected to the load by a passage 45.

Since the valve 32 is urged open with a constant force by the pressure in the chamber 36, initially the outlet port 30 will be fully open in position to supply oil to the load and will remain open to some degree until the product of the pressure in the load line by the area of the small piston 38 exceeds the product of the pressure in the chamber 36 by the area of the large piston 34, then the valve 32 will close port 30. When the port is closed, the pressure in the load line drops, provided the load is consuming oil or there is any leak in the system downstream of the regulator valve. When the pressure drops the valve opens the outlet port 30 again. This opening of the port supplies oil and restores the pressure in the load line to the value at which the valve closes as above described. This action is repeated cyclically.

In practice the valve 32 may hunt or move rapidly either between closed position and some open position or between two different open positions so that oil is supplied to the load line in very rapid pulses of slightly varying pressure providing an average pressure which is constant for all practical purposes of operating the load. The frequency of this hunting for metering the flow, as it is called, may be of the order of one hundred or two hundred cycles per second. Thus the inherent variations of pressure are both minute and extremely brief. Or, if the demand is precisely constant, the valve may take a fixed metering position. The area of the small piston may have any desired area as relates to the large piston, for example one-tenth the area of the large piston. In such case a pressure of two hundred pounds per square inch maintained in the chamber 36 will maintain a pressure of two thousand pounds per square inch in the load line, for example.

The area of the piston 34 and the total distance it can travel in regulating the pressure are so selected with reference to the volume of the chamber 36 that the total volume of the gas confined in the chamber 36 and in the right end of the bore 33 does not change significantly during movement of the valve. Therefore the pressure in the chamber 36 does not change significantly but remains constant for all practical purposes of the invention, as long as the temperature does not change significantly.

The invention includes various devices to increase the sensitivity of the valve, regulate the speed and frequency of its response, and to prevent over-correction in the course of regulating. The valve closing chamber or bore 40 communicates both with the load pressure indicating chamber 44 and with one end of an expansible chamber in a cylinder 46, in which is maintained the pressure existing in a pressure accumulator 48 separated hydraulically from the chamber 47 and bore 40 by a piston 50 slidable in the cylinder 46. The accumulator 48 is also charged with gas such as nitrogen under pressure. The pressure is preferably selected so that when the piston 50 is midway between the ends of the cylinder 46 and the accumulator pressure is exactly equal to the load line pressure, the accumulator pressure bears the same ratio to the pressure in the chamber 36 as the area of the large piston 34 bears to the area of the small piston 38. In the example under consideration the pressure in the accumulator 48 would be 2,000 pounds per square inch. The bore 40 is connected to the chamber 47 by a variable choke 52. This constitutes adjustable means for varying the area of communication between the expansible chamber 47 and the valve closing chamber 40. This helps to control the response of the valve, as will be explained.

To control the valve 32 in moving toward open position except as influenced by the force of the regulated pressure, a damping chamber formed by the left end of the bore 33 is connected to a vent port 54 through a variable choke 56 which choke can influence the speed of response of the valve, as will be explained.

In order to reduce the friction of the small piston 38 in the bore 40 the piston is provided with an axial bore 58 open to the bore 40 and having radial passages 60 which conduct oil under load line pressure between the piston 38 and the wall of the bore 40 by grooves 61. This provides high pressure lubrication and a free floating piston and substantially friction-free assembly.

The load line pressure indicating port 43 is located with respect to the left end of the piston 38 so that this piston forms a valve controlling communication between the conduit 45 and the bore 40. When the small piston is fully to the left, as determined by the stop 42, it can restrict but not entirely prevent communication between the line 45 and the bore 40. When the valve 32 is closed and the piston 38 is positioned fully to the right there is unrestricted communication between the line 45 and the bore 40. This is to control opening speed of the valve 32, as will be explained.

The volume of the cylinder 46 has such relation to the volume of the accumulator 48 that travel of the piston 50 from one end to the other of the cylinder 46 changes, by some desired amount, the volume of gas confined in the accumulator and the left end of the cylinder, and so changes the pressure exerted on the piston 50 by the accumulator through a desired amount. This is to provide certain desired effects on the operation of the regulator valve as will be explained.

*Operation of schematic arrangement*

Before the system is put into operation the pressure in the chamber 36 holds the valve 32 to open the outlet port fully, and there is no pressure in the load line because the shut-off valve 25 is closed. Therefore the small piston 38 is held fully to the left against the stop 42 by the valve 32 and the accumulator piston 50 is held against the right end of the cylinder 46 by the accumulator pressure. Assume that the accumulator pressure is adjusted to be two thousand pounds when the piston 50 is in the center of the cylinder 46 and that the pressure in chamber 36 is two hundred pounds and that the area of the small piston 38 is one-tenth the area of the large piston 34. When the valve 25 is open oil will flow into the load line and through the line 45 into the bore 40 and cylinder 46 and the pressure in these spaces will increase. The pressure in the accumulator is now slightly less than two thousand pounds, for example nineteen hundred ninety pounds, but as the pressure in the load line approaches two thousand pounds this pressure will fill the right end of the cylinder with oil and move the piston 50 toward the center of the cylinder. As soon as the pressure in the load line exceeds two thousand pounds even by a very small amount the small piston 38 and the valve 32 will start to move to the right tending to restrict or close the outlet port 30 and the pressure in the accumulator will rise slightly above two thousand pounds, the piston 50 being forced slightly to the left of the center of the cylinder 46. At some finite but very small time thereafter, and at some finite but very small pressure above two thousand pounds, for example two pounds, the piston 38 and the valve 32 will be pushed fully to the right and the outlet port 30 will be closed. If oil is being used at the load or if there is any leak in the system closing of the port 30 will cause an immediate drop in pressure in the load line. This will do two things, first, the pressure in the accumulator forces oil out of the chamber 46 into the load line tending to supply, to the extent of the volume of the oil in the cylinder 46, the oil removed from the load by usage or leakage and thus tending to keep the pressure in the load line constant. Second, the valve 32 opens the outlet port 30 to some extent supplying oil to the load line and also tending to bring the pressure back to the desired value.

If the valve 32 starts to move too rapidly from fully closed position toward open position, it could, unless means were provided to prevent it, move too far to the left and admit oil to the load line faster than it is being used by the load. This would tend to build up the pressure in the load line to an undesirably high value before the pressure could act in the pressure indicating chamber 44 which should stop the opening movement of the valve or move it back toward closed position. Pressure in the load line increasing beyond the intended value will tend to increase gas pressure in the accumulator, forcing the piston 50 to the left. In order to prevent over-correction and to control the speed of opening of the valve 32, the variable choke 52 is placed in the bore 40 between the port 43 and the chamber 47. The size of the opening through the choke determines the speed at which oil can flow between the bore 40 and the chamber 47, and this can be regulated to suit the operating conditions. Also, if pressure tends to fall in the load line, oil tends to flow from the chamber 47 through the port 43 to the line 45 and to the load line, as has been explained above. When the port 30 is fully closed, the port 43 is fully open, but opening movement of the valve tends to close the port 43 although the piston 38 is so proportioned that it cannot completely close the port 43 as has been explained. However as the valve 32 increases its opening, the small piston 38 progressively reduces the opening of the port 43 and restricts the rate at which oil can flow from the bore 40 to the line 45. The piston 38 and port 43 together constitute adjustable means for determining the area of communication between passage 21 and closing chamber 40, and the piston 38 is responsive to opening of the valve for reducing this area. Progressive closing of the port 43 causes the closing chamber 40 to act as a cushion or damper which opposes movement of the piston 38 to the left and thus opposes opening movement of the valve 32. Therefore not only can the rate of oil flow from the cylinder 47 to the load line be controlled, but also the rate of opening of the valve 32 can be controlled. For example, if the choke 52 is adjusted to provide a very small opening, movement of the valve 32 may be sufficiently rapid to tend to move oil out of the bore 40 faster than it can be pressed through the choke 52. In such case the oil may be forced out of the bore 40 through the port 43 into conduit 45 by the piston 38 moving to the left. As the piston starts to move, oil can flow rapidly from the bore 40 into the line 45 through the wide open port 43, but movement of the piston progressively restricts the opening through this port and restricts the rate of flow, and thus the rate of opening movement of the valve 32 is reduced with the amount of such opening. Thus the apparatus can be adjusted to prevent over-correction of overshooting of the valve 32 by preventing it from opening too far, to effect the desired correction.

Structure

FIGS. 2 to 10 show one form of actual structure of the valve diagrammatically illustrated in FIG. 1. Referring first to FIGS. 2 and 3, the casing 26 may be formed of blocks 64, 66, 68, 70, 72 and 74 bolted together in alignment by bolts 76 and sealed by any suitable sealing rings or gaskets 77. The block 64 carries the gas pressure chamber 36, which may be any suitable container secured in any desired manner to the block, as by welding. This block has a charging opening 78 through which the chamber may be charged with gas under pressure and sealed, or its pressure may be regulated and maintained. The block 64 has a central bore 80 through which the gas pressure chamber exerts pressure on the valve 32.

The block 66 has a central bore 82 in which is placed a liner 84 in which the spool valve 32 slides. This block also has an inlet chamber 86 communicating with the inlet port 28 and the outlet chamber 88 communicating with the inlet chamber through the liner, and connected to the outlet port 30. The liner has openings 90 and 92 registering with the inlet and outlet chambers respectively.

As shown by the reference characters in FIG. 4, the spool valve is formed into a hollow head 94 at its left end, the hollow being to reduce the inertia of the valve and to provide a vent chamber for the seal on piston 34 as will be explained. In order to reduce the inertial of the valve, it is made as small as is practical, and is formed of lightweight material, such as magnesium. In order to make the valve sturdy and long wearing, the regulating edge of the valve is formed, as shown in FIGS. 1 and 3, of a ring 96 of harder material, such as steel or Invar, or it may be chrome plated.

The piston 34 must seal the load line pressure, which may be several thousand p.s.i., from the relatively low pressure in chamber 36, and it is important that no oil leak from the system into this chamber. Also the friction between the piston and the liner must be very low, to promote quick response and high sensitivity. To this end a novel sealing and draining arrangement is provided.

As shown in FIGS. 3a and 4 the piston face is formed by a washer 100 slidable on a stem 102 and held in place by jam nuts 104. The inner face of the piston has a step or shoulder 106 and the main body of the piston has a double step or double shoulder 108 so that when the washer is assembled on the body of the piston a T-shaped groove around the piston is formed which holds a sealing ring 110 of Teflon or similar low friction and slippery material, flanked by two O-rings 112 of neoprene or similar elastic material. Adjustment of the jam nuts exerts axial pressure on the O-rings so that the shoulders exert outward radial pressure on these rings, and this deforms the edges 114 of the sealing ring and urges them into sealing contact with the liner 84. The sealing ring 110 is sealed to both O-rings and both O-rings are sealed to the piston by the pressure developed by the jam nuts. Suitable adjustment of the jam nuts thus determines both the effectiveness of the seal and the friction between the piston and the liner. Nevertheless, unless means were provided to prevent it, oil could leak from the valve chamber between the piston 34 and liner 84 into the grooves which hold the sealing and O-rings, and if this happens the pressure of the oil on one or both of these rings can deform the rings so that they exert such high pressure on the liner as to produce an intolerable friction or even binding of the valve. To prevent this, I form a groove 116 around the piston 34 on the high pressure side of the seal and vent this groove to a space of low pressure through radial passages 118, a central bore 120 in the valve stem, and the hollow space in the head 94 which is ultimately connected to vent port 54, as will be explained.

The bleed groove 116 is constantly covered by the liner adjacent the inlet opening, and of course at the high pressures mentioned, some oil constantly leaks into the groove and out the vent. However the quantity is small, and is constantly made up by the high pressure source of supply 22. This arrangement provides a lubricated seal of very low friction, and prevents the high pressure from being communicated to the seal and thus distorting or causing it to bind against the surrounding cylinder wall.

Figure 7:
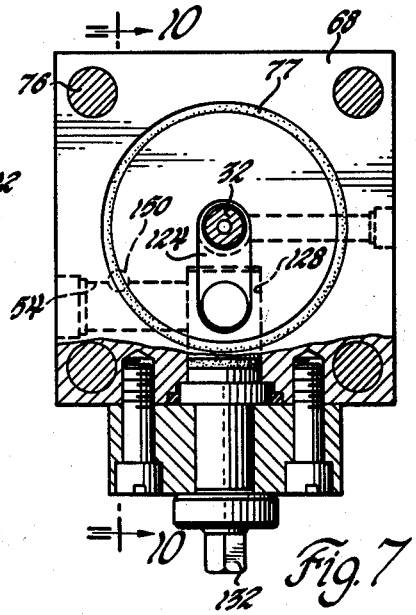
FIG. 7 is a section on the line 7—7 of FIG. 3.
Figure 8:
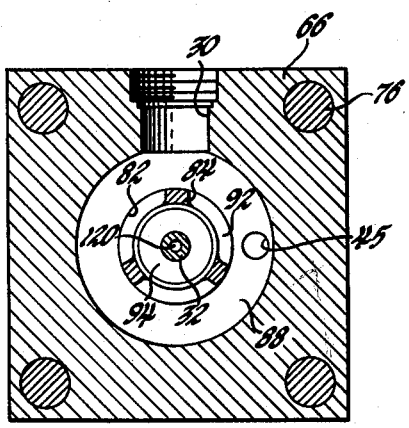
FIG. 8 is a section on the line 8—8 of FIG. 3.
Figure 9:
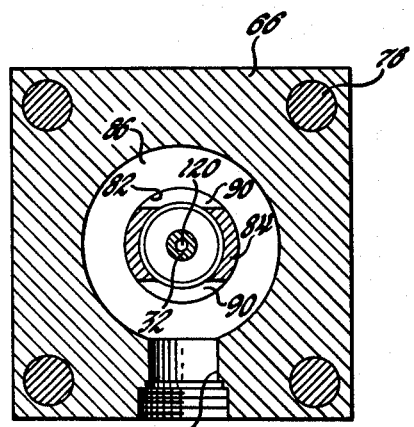
FIG. 9 is a section on the line 9—9 of FIG. 3.

The sandwich block 68 has a central bore 122 terminating at its left end in the load line pressure indicating chamber 44, and at its right end in a vent chamber 124 registering with the hollow end of the head 94. A sleeve 125 is placed in the bore 122, and this sleeve contains the bore 40 which receives the small piston 38, and is perforated to form the port 43. As shown in FIG. 4, the load line pressure passage 45 is formed jointly by a bore in the block 68 and a registering bore 126 formed in block 66 and communicating with the discharge chamber 88. As shown in FIG. 7, the vent port 54 is formed by a bore in the block 68 which bore communicates with the vent chamber 124 through a bore 128 (FIG. 3) which contains an adjustable rotary vent valve 130 having an opening therethrough which constitutes the adjustable choke 56 previously mentioned. The effective size of the choke can be varied by turning the valve by an external wrench-hold 132.

As shown in FIGS. 3, 4, and 6, the block 70 has a central bore 134 registering with the bore 122 in block 68, and which provides the communication between the bore 40 and the cylinder 46. The block 70 has also a cross bore 136 containing an adjustable rotary valve 138 having an opening therethrough which opening constitutes the variable choke 52. This choke can be adjusted by turning the valve by an external wrench-hold 142.

The chamber 46 is formed by a bore through the center of the sandwich block 72 registering with the bore 134 in the block 70. The piston 50 slides freely in the bore 46 and may be sealed by one or more seals 143 constructed and arranged like the seal 110–112 on the piston 34.

Alternatively instead of having the pressure in the accumulator 48 equal to the load line pressure when the piston 50 is in the center of the cylinder 46, I may charge the accumulator with a pressure higher than the desired load line pressure. For example if the load line pressure is to be maintained at 2,000 p.s.i., the accumulator pressure may be 2,200 p.s.i. In such case the piston 50 will be held normally against the stop formed by the right end of the cylinder 46, and the valve 32 normally will be urged closed solely by the pressure of oil in the load line. Then the accumulator acts to oppose opening movement of the valve, and tends to prevent over-correction in cases of sudden large increase in volumetric demand. In such cases, for example if the demand increases from zero to fifty gallons per minute in 1/100 of a second, the spool valve 32 may tend to move too fast and to open too far. Opening of the valve progressively restricts flow between the bore 40 and the load line, as has been explained, and with this communication reduced, the opening movement of the valve can tend to push the piston 50 back against the pressure of the accumulator 48. The increased pressure of the accumulator, above load line pressure, makes the accumulator more effective as a snubber or resilient buffer which opposes opening movement.

The block 74 is similar to the block 64, carrying the high pressure accumulator 48, formed by any suitable container secured to the block in any suitable manner, as by welding. The block also has a charging opening 144 by which the accumulator can be charged and sealed and its pressure selected or controlled. The accumulator communicates with the chamber 46 through a central bore 146.

Figure 10:
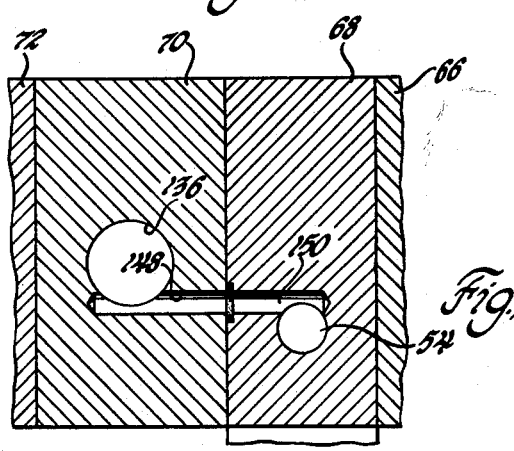
FIG. 10 is a section on the line 10—10 of FIG. 7.

The space in the bore 136 behind the valve 138 is preferably drained or vented to prevent any pressure building up due to leakage past the valve. This may be accomplished as shown in FIGS. 6 and 10 by a bore 148 in the block 70 communicating at one end with the valve bore 136 and communicating at its other end with a registering bore 150 in the block 68, which latter bore communicates with the vent port 54.

The foregoing construction and arrangement enables me to provide an extremely sensitive and responsive valve which can maintain high pressures of several thousand p.s.i. within very small variations, such as plus or minus two to ten pounds. Also the moving parts can be made with such low friction that the frequency of movement of the valve may be of the order of 100 to 200 cycles per second, which high frequency is made possible by the low inertia and high speed of the valve, and this in turn makes possible the very close regulation of pressure. Also the high speed of movement of the valve makes possible the instant supply of oil to meet a widely varying flow demand without significant changes in pressure.

The arrangement of the sandwich blocks makes it very easy to change the characteristics of the valve by substituting a small piston 38 of different diameter, thus effecting a different ratio between the pressure of the chamber 36 and the pressure maintained in the load. Also whenever a substantially one-to-one ratio is desired, that is when the load line pressure is to be maintained at the value of the pressure of the cylinder 36, this can be accomplished very simply without changing parts by simply connecting the vent port 54 with the load line. Except when this is done the vent port discharge discharges to atmospheric pressure, for example to the tank or reservoir from which the high pressure source 22 draws its supply.

I claim:

1. A variable volume constant pressure fluid supply system comprising in combination a high pressure source of supply, a reduced pressure delivery passage, a valve chamber, an inlet from the supply to the valve chamber, an outlet from the valve chamber to the delivery passage, a valve in the chamber movable to a closed position in which it prevents communication between the inlet and the outlet, and movable to a number of open positions in which it permits communication between the inlet and the outlet through a passage of varying area, a closed chamber filled with gas under pressure, a pressure surface exposed to the pressure of said closed chamber and connected to the valve for urging the valve toward open position, the area of the pressure surface being so related to the volume of the closed chamber and to the distance through which the valve can move that maximum movement of the valve does not significantly change the pressure of the closed chamber fluid pressure actuated means, a fluid pressure closing chamber connected to said fluid pressure actuated means and to the delivery passage for urging the valve closed, adjustable means for determining the area of communication between the delivery passage and said closing chamber including means responsive to opening of the valve for progressively reducing the area of communication between the closing chamber and the delivery passage, an expansible chamber connected with the closing chamber, adjustable means for varying the area of communication between the expansible chamber and the closing chamber, an accumulator filled with gas under pressure, movable means for communicating the pressure of the accumulator to the expansible chamber while preventing fluid communication therebetween, and a variable volume damping chamber for opposing opening of the valve, said damping chamber being filled with gas and connected through a passage of controllable area to a space of lower pressure than the delivery passage.

2. A variable volume constant pressure fluid supply system comprising in combination a high pressure source of supply, a reduced pressure delivery passage, a valve chamber, an inlet from the supply to the valve chamber, an outlet from the valve chamber to the delivery passage, a valve in the chamber movable to a closed position in which it prevents communication between the inlet and the outlet, and movable to a number of open positions in which it permits communication between the inlet and the outlet through a passage of varying area, a closed chamber filled with gas under pressure, a pressure surface exposed to the pressure of said closed chamber and connected to the valve for urging the valve toward open position, the area of the pressure surface being so related to the volume of the closed chamber and to the distance through which the valve can move that maximum movement of the valve does not significantly change the pressure of the closed chamber, fluid pressure actuated means, a fluid pressure closing chamber connected to said fluid pressure actuated means and to the delivery passage for urging the valve closed, adjustable means for determining the area of communication between the delivery passage and said closing chamber including means responsive to opening of the valve for progressively reducing the area of communication between the closing chamber and the delivery passage, an expansible chamber connected with the closing chamber, adjustable means for varying the area of communication between the expansible chamber and the closing chamber, and an accumulator filled with gas under pressure, movable means for communicating the pressure of the accumulator to the expansible chamber while preventing fluid communication therebetween.

3. A variable volume constant pressure fluid supply system comprising in combination a high pressure source of supply, a reduced pressure delivery passage, a valve chamber, an inlet from the supply to the valve chamber, an outlet from the valve chamber to the delivery passage, a valve in the chamber movable to a closed position in which it prevents communication between the inlet and the outlet, and movable to a number of open positions in which it permits communication between the inlet and the outlet through a passage of varying area, a closed chamber filled with gas under pressure, a pressure surface exposed to the pressure of said closed chamber and connected to the valve for urging the valve toward open position, the area of the pressure surface being so related to the volume of the closed chamber and to the distance through which the valve can move that maximum movement of the valve does not significantly change the pressure of the closed chamber, fluid pressure actuated means, a fluid pressure closing chamber connected to said fluid pressure actuated means and to the delivery passage for urging the valve closed, adjustable means for determining the area of communication between the delivery passage and said closing chamber including mean responsive to opening of the valve for progressively reducing the area of communication between the closing chamber and the delivery passage, an expansible chamber connected with the closing chamber, and adjustable means for varying the area of communication between the expansible chamber and the closing chamber.

4. A variable volume constant pressure fluid supply system comprising in combination a high pressure source of supply, a reduced pressure delivery passage, a valve chamber, an inlet from the supply to the valve chamber, an outlet from the valve chamber to the delivery passage, a valve in the chamber movable to a closed position in which it prevents communication between the inlet and the outlet, and movable to a number of open positions in which it permits communication between the inlet and the outlet through a passage of varying area, a closed chamber filled with gas under pressure, a pressure surface exposed to the pressure of said closed chamber and connected to the valve for urging the valve toward open position, the area of the pressure surface being so related to the volume of the closed chamber and to the distance through which the valve can move that maximum movement of the valve does not significantly change the pressure of the closed chamber, fluid pressure actuated means, a fluid pressure closing chamber connected to said fluid pressure actuated means and to the delivery passage for urging the valve closed, adjustable means for determining the area of communication between the delivery passage and said closing chamber including means responsive to opening of the valve for progressively reducing the area of communication between the closing chamber and the delivery passage.

5. A variable volume constant pressure fluid supply system comprising in combination a high pressure source of supply, a reduced pressure delivery passage, a valve chamber, an inlet from the supply to the valve chamber, an outlet from the valve chamber to the delivery passage, a valve in the chamber movable to a closed position in which it prevents communication between the inlet and the outlet, and movable to a number of open positions in which it permits communication between the inlet and the outlet through a passage of varying area, a closed chamber filled with gas under constant pressure, a pressure surface exposed to the pressure of said closed chamber and connected to the valve for urging the valve toward open position, fluid pressure actuated means, a fluid pressure closing chamber connected to said fluid pressure actuated means and to the delivery passage for urging the valve closed, adjustable means for determining the area of communication between the delivery passage and said closing chamber including means responsive to opening of the valve for progressively reducing the area of communication between the closing chamber and the delivery passage.

6. A variable volume constant pressure fluid supply system comprising in combination a high pressure source of supply, a reduced pressure delivery passage, a valve chamber, an inlet from the supply to the valve chamber, an outlet from the valve chamber to the delivery passage, a valve in the chamber movable to a closed position in which it prevents communication between the inlet and the outlet, and movable to a number of open positions in which it permits communication between the inlet and the outlet through a passage of varying area, means for urging the valve open, fluid pressure actuated means, a fluid pressure closing chamber connected to said fluid pressure actuated means and to the delivery passage for urging the valve closed, adjustable means for determining the area of communication between the delivery passage and said closing chamber including means responsive to opening of the valve for progressively reducing the area of communication between the closing chamber and the delivery passage, an expansible chamber connected with the closing chamber, adjustable means for varying the area of communication between the expansible chamber and the closing chamber, an accumulator filled with gas under pressure, movable means for communicating the pressure of the accumulator to the expansible chamber while preventing fluid communication therebetween, and a variable volume damping chamber for opposing opening of the valve, said damping chamber being filled with gas and connected through a passage of controllable area to a space of lower pressure than the delivery passage.

7. A variable volume constant pressure fluid supply system comprising in combination a high pressure source of supply, a reduced pressure delivery passage, a valve chamber, an inlet from the supply to the valve chamber, an outlet from the valve chamber to the delivery passage, a valve in the chamber movable to a closed position in which it prevents communication between the inlet and the outlet, and movable to a number of open positions in which it permits communication between the inlet and the outlet through a passage of varying area, means for urging the valve open, fluid pressure actuated means, a fluid pressure closing chamber connected to said fluid pressure actuated means and to the delivery passage for urging the valve closed, adjustable means for determining the area of communication between the delivery passage and said closing chamber including means responsive to opening of the valve for progressively reducing the area of communication between the closing chamber and the delivery passage, an expansible chamber connected with the closing chamber, adjustable means for varying the area of communication between the expansible chamber and the closing chamber, and an accumulator filled with gas under pressure, movable means for communicating the pressure of the accumulator to the expansible chamber while preventing fluid communication therebetween.

8. A variable volume constant pressure fluid supply system comprising in combination a high pressure source of supply, a reduced pressure delivery passage, a valve chamber, an inlet from the supply to the valve chamber, an outlet from the valve chamber to the delivery passage, a valve in the chamber movable to a closed position in which it prevents communication between the inlet and the outlet, and movable to a number of open positions in which it permits communication between the inlet and the outlet through a passage of varying area, means for urging the valve open, fluid pressure actuated means, a fluid pressure closing chamber connected to said fluid pressure actuated means and to the delivery passage for urging the valve closed, adjustable means for determining the area of communication between the delivery passage and said closing chamber including means responsive to opening of the valve for progressively reducing the area of communication between the closing chamber and the delivery passage, an expansible chamber connected with the closing chamber, and adjustable means for varying the area of communication between the expansible chamber and the closing chamber.

9. A variable volume constant pressure fluid supply system comprising in combination a high pressure source of supply, a reduced pressure delivery passage, a valve chamber, an inlet from the supply to the valve chamber, an outlet from the valve chamber to the delivery passage, a valve in the chamber movable to a closed position in which it prevents communication between the inlet and the outlet, and movable to a number of open positions in which it permits communication between the inlet and the outlet through a passage of varying area, means for urging the valve open, fluid pressure actuated means, a fluid pressure closing chamber connected to said fluid pressure actuated means and to the delivery passage for urging the valve closed including adjustable means for determining the area of communication between the delivery passage and said closing chamber, and means responsive to opening of the valve for progressively reducing the area of communication between the closing chamber and the delivery passage.

References Cited by the Examiner

UNITED STATES PATENTS

| 2,202,313 | 5/40 | Grove | 137—505.42 |
| 2,476,378 | 7/49 | Majneri | 251—62 |
| 2,748,801 | 1/56 | McCuistion | 138—31 |
| 2,764,997 | 10/56 | McCuistion | 138—31 |
| 2,783,020 | 2/57 | Kleczek | 251—62 |
| 2,888,033 | 5/59 | Eickmeyer | 137—505 |
| 2,894,532 | 7/59 | Gaylord | 137—505 |

FOREIGN PATENTS 258,198 9/26 Great Britain.

ISADOR WEIL, *Primary Examiner.*

WILLIAM F. O'DEA, *Examiner.*